(12) United States Patent
Lee et al.

(10) Patent No.: US 6,384,507 B1
(45) Date of Patent: May 7, 2002

(54) CORELESS AC INDUCTION MOTOR

(75) Inventors: Dai Gil Lee; Seung Hwan Chang, both of Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/710,806

(22) Filed: Nov. 9, 2000

(30) Foreign Application Priority Data

Nov. 10, 1999 (KR) .............................. 99/49705

(51) Int. Cl.⁷ .............................. H02K 1/22; H02K 1/32
(52) U.S. Cl. .......................... 310/211; 310/44; 310/61; 310/261; 310/266
(58) Field of Search ................................ 310/261, 266, 310/212, 211, 44, 52, 61

(56) References Cited

U.S. PATENT DOCUMENTS

| | | | | |
|---|---|---|---|---|
| 1,113,565 A | * | 10/1914 | Lee | 310/266 |
| 3,549,923 A | * | 12/1970 | Kurakin et al. | 310/162 |
| 3,629,626 A | * | 12/1971 | Abbott | 310/49 |
| 5,311,092 A | * | 5/1994 | Fisher | 310/266 |

* cited by examiner

Primary Examiner—Burton S. Mullins
(74) Attorney, Agent, or Firm—Vidas, Arrett&Steinkraus PA

(57) ABSTRACT

Disclosed herein is a coreless AC Induction motor. The motor comprises a cup type coreless rotor. A rotating shaft is combined with the cup type coreless rotor. An induction rod is inserted into the cup type coreless rotor to guide a magnetic flux from the stator effectively. A stator is positioned around the coreless rotor. The cup type coreless rotor comprises a squirrel cage-shaped conduction cylinder and composite material or polymer resin. The squirrel cage-shaped conduction cylinder is made of material having high electric conductivity, such as aluminum or copper, and has plurality of slots along the axis of the squirrel cage-shaped conduction cylinder. The composite material or polymer resin fills the slots of the squirrel cage-shaped conduction cylinder to make up for the low stiffness of the squirrel cage-shaped conduction cylinder.

10 Claims, 4 Drawing Sheets

A-A sectional view

B-B sectional view

CORELESS AC INDUCTION MOTOR

BACKGROUND OF THE INVENTION

1. Field of the Invention

The present invention generally relates to AC induction motors, and more particularly to a coreless AC induction motor that employs a cup-type coreless rotor made of an aluminum or copper conduction cylinder so as to reduce the inertial force of the rotating parts of the AC induction motor.

2. Description of the Prior Art

In general, a cup-type coreless rotor is utilized in a small-capacity DC motor for low power output, but is not used in the field of a large-capacity AC motor.

In a rotating body such as rotor of motor, a centrifugal force is generated in proportion to the mass of a rotor and the square of the rotational speed of a rotor, so that a rotor with high rotating speed may have excessive deformation due to a large stress by the centrifugal force.

The quality of machined products mainly depend on the precision of machine tool which is equipped with built-in type spindle system that is composed of the rotor of motor and the spindle shaft, but the heavy mass of rotor can deteriorate dynamic stability of the built-in type spindle system because the heavy mass of rotor may cause excessive stress and deformation. Therefore, it is important to reduce the inertial force of the rotor by reducing mass of rotor.

The rotating speed of a built-in type spindle generally is restricted by a DN value (where D is a bearing nominal diameter in mm and N is the revolutions per minute of the spindle) and the critical whirling vibration frequency of the spindle. In particular, in the case of a built-in type spindle which is composed of the spindle shaft and the rotor of motor, the bending natural frequency is largely influenced by the mass of the rotor of a motor. Accordingly, as the mass of the rotor of a motor is increased, the bending natural frequency of a built-in type spindle is decreased, thus the heavy mass of rotor limits the maximum rotating speed of the built-in type spindle.

Accordingly, in order to get stable driving condition of a built-in type spindle, it is necessary to increase the specific bending stiffness of a spindle shaft or to decrease the mass of rotor of a motor.

SUMMARY OF THE INVENTION

Accordingly, the present invention considers the above problems occurring in the prior art, and an object of the present invention is to provide a coreless AC induction motor that employs a cup type coreless rotor made of an aluminum or copper conduction cylinder so as to reduce the inertial force of the rotating parts of the AC induction motor and to allow the motor to have high speed and low rotational inertia.

Another object of the present invention is to provide a coreless induction motor that employs an air bearing, thereby preventing direct contact between rotating parts and stationary parts and dissipating generated heat during the operation of the motor.

In order to accomplish the above object, the present invention provides a cup-type coreless AC induction motor, comprising: a cup-type coreless rotor; a rotating shaft combined with the cup-type coreless rotor; a stationary induction rod inserted into the interior of the cup-type coreless rotor to guide a magnetic flux from stator coils; and a stator positioned around the coreless rotor; wherein the cup type coreless rotor comprises a squirrel cage-shaped conduction cylinder and composite material or polymer resin; the squirrel cage-shaped conduction cylinder is made of material having high electric conductivity, such as aluminum or copper and has regularly plurality of slots along the axis of the conduction cylinder; The slots of the squirrel cage-shaped conduction cylinder may be filled with the composite material or polymer resin in order to make up for the low stiffness of squirrel cage-shaped conduction cylinder.

In accordance with a feature of the present invention, the composite material or polymer resin includes powder having high magnetic permeability, such as iron or ferrite powder, to make up for the low magnetic permeability of the squirrel cage-shaped conduction cylinder.

In accordance with a feature of the present invention, a motor may include heat pipes, the heat pipes can be inserted into the slots of the cup type squirrel cage-shaped conduction cylinder so as to dissipate heat generated effectively.

In accordance with a feature of the present invention, the motor further comprises bearings, the bearings being positioned between the cup type squirrel cage-shaped conduction cylinder and the induction rod to align the squirrel cage-shaped conduction cylinder with the induction rod and positioned between rotating shaft and motor housing to support rotating shaft.

In accordance with a feature of the present invention, the induction rod has an air supply bore in its central portion and also has plurality of air bearing holes connected with the air supply bore, so that supplied air functions as a bearing between the coreless rotor and the induction rod.

BRIEF DESCRIPTION OF THE DRAWINGS

The above and other objects, features and other advantages of the present invention will be more clearly understood from the following detailed description with the accompanying drawings, in which.

DESCRIPTION OF THE PREFERRED EMBODIMENTS

Figure 1:
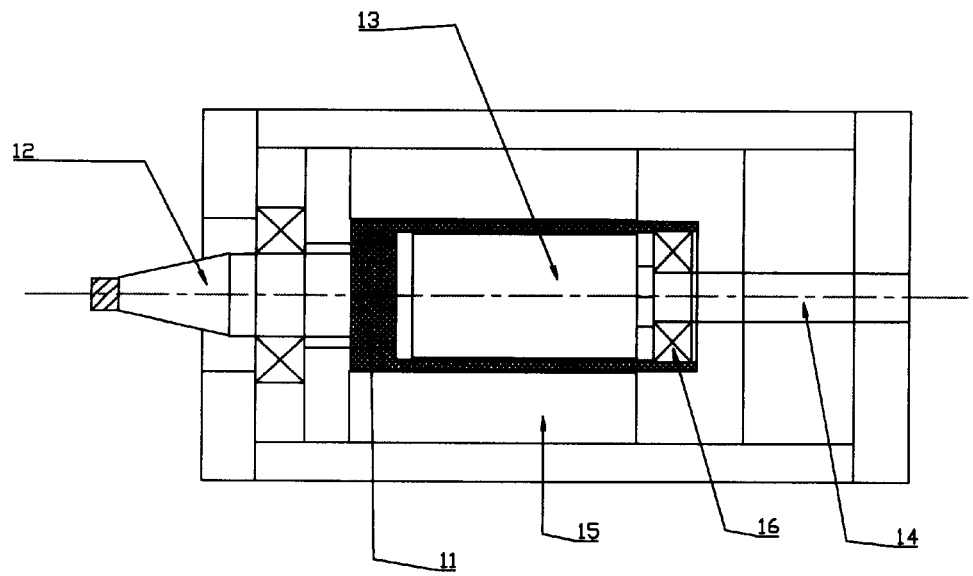
FIG. 1 is a schematic diagram of a coreless AC induction motor in accordance with a first embodiment of the present invention.

Reference should be made to the drawings, in which the same reference numerals are used throughout the different drawings to designate the same or similar components.

First Embodiment

Figure 2:
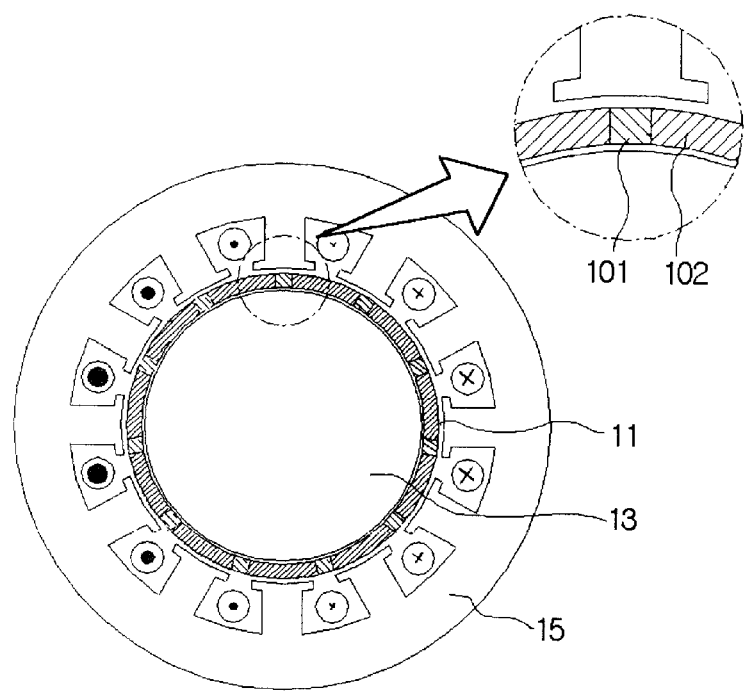
FIG. 2 is a cross section of the coreless AC induction motor shown in FIG. 1.
Figure 3:
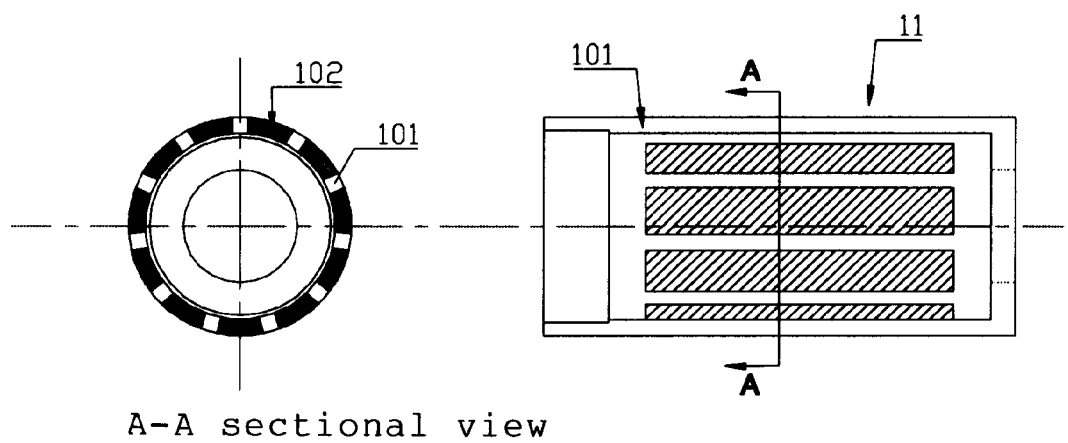
FIG. 3 is a detailed diagram of the cup type coreless rotor of the coreless AC induction motor shown in FIG. 1.
Figure 4:
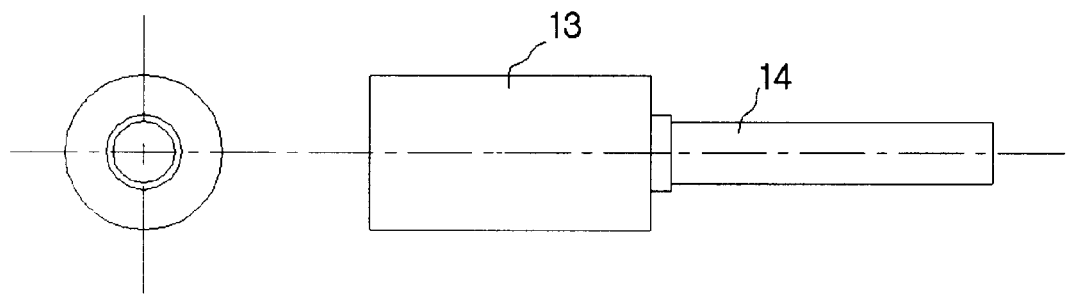
FIG. 4 is a detailed diagram of the induction rod and induction rod shaft of the coreless AC induction motor shown in FIG. 1.
Figure 5:
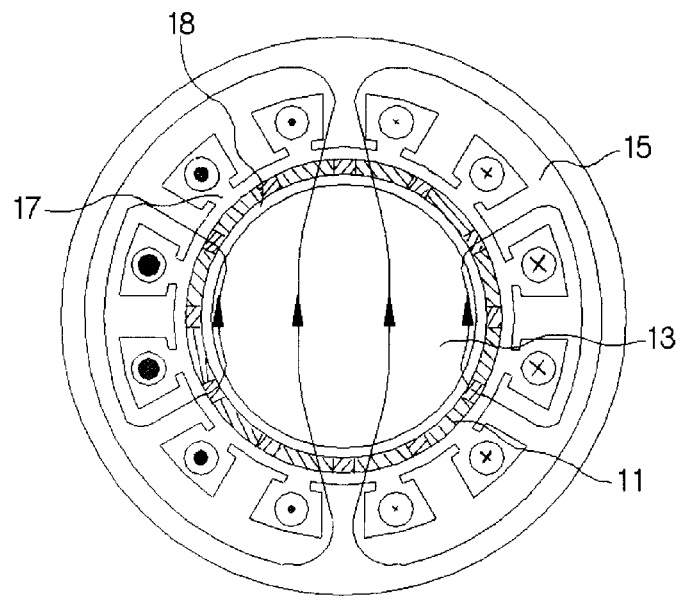
FIG. 5 is a diagram showing a magnetic flux generated in the coreless AC induction motor shown in FIG. 1.

In accompanying drawings, FIG. 1 is a schematic diagram of a coreless AC induction motor in accordance with a first embodiment of the present invention, FIG. 2 is a cross section of the coreless AC induction motor shown in FIG. 1, FIG. 3 is a detailed diagram of the cup type coreless rotor of the coreless AC induction motor shown in FIG. 1, FIG. 4 is a detailed diagram of the induction rod and induction rod shaft of the coreless AC induction motor shown in FIG. 1, and FIG. 5 is a diagram showing a magnetic flux generated in the coreless AC induction motor shown in FIG. 1.

As depicted in FIGS. 1 to 4, a coreless AC induction motor of the present invention can be divided into rotating parts and stationary parts. The rotating parts comprise a cup type coreless rotor 11 and a rotating shaft 12 combined with the coreless rotor 11. The stationary parts comprise an induction rod having a small air gap with the cup type coreless rotor 11, an induction rod shaft 14 combined with the induction rod 13 and a stator 15 positioned around the cup type coreless rotor 11.

The cup type coreless rotor 11 consists of a squirrel cage-shaped conduction cylinder 101 having a plurality of slots (FIG. 3) and composite material 102 filling the slots. The cup type coreless rotor 11 may consist of only a squirrel cage-shaped conduction cylinder 101 without the composite material 102.

The squirrel cage-shaped conduction cylinder 101 which is made of aluminum or copper pipe having high electric conductivity, has plurality of axial slots. An end mill, electric discharge wire machining, laser machining apparatus, etc. can be employed to form the slots.

Otherwise, the squirrel cage-shaped conduction cylinder 101 can be fabricated by assembling plurality of conduction rods and two end rings with holes for assembly. Fabrication can be completed by inserting both ends of the conducting rods into the holes of end rings.

Powder having high magnetic permeability, such as iron or ferrite powder, is included in the composite material or polymer resin 102 in order to enhance the low stiffness and the low magnetic permeability of the squirrel cage-shaped conduction cylinder 101 made of aluminum or copper.

The rotating shaft 12 may be fabricated with fiber reinforced composite material to reduce the mass of the rotating parts and if the rotating shaft and cup-type coreless rotor are made of different materials as in this case, they can be joined using adhesive bonding or mechanical joining, and the induction rod 13 may be replaced with any material having high magnetic permeability.

Since the coreless AC induction motor includes a rotating parts and stationary parts that are separated from each other with small air gap, it is important that the two parts are precisely aligned with each other during rotation. If the motor rotates while the rotating parts are not aligned with stationary parts due to deflection under their own weights, etc., the cup type coreless rotor 11 and the induction rod 13 may come into contact with each other, and the rotating parts to may have serious problems including noise and vibration. Therefore, a bearing 16 is disposed between the squirrel cage-shaped conduction cylinder 101 and the induction rod shaft 14.

A heat pipe may be inserted into the slots of the squirrel cage-shaped conduction cylinder 101 in order to transmit heat generated outside while the cup type coreless rotor 11 rotates at high speed. In such a case, the heat pipe can be installed in the slots with polymer resin. The heat pipe is a cooling device in which heat is transmitted from a heat source to a remote heat sink while operating fluid, such as ammonia, methanol, Freon or the like, repeats an isothermal change cycle in vacuum pipes. Heat is absorbed in the process of the phase change of the operating fluid from a liquid phase to a gaseous phase when the heat is applied to the heat pipe, gaseous operating fluid moves from a heat source side of the heat pipe to the opposite heat sink side, and heat is transmitted in the process of the phase change of the operating fluid from a gaseous phase to a liquid phase.

The operation of the coreless AC induction motor according to this invention is described with FIG. 5. As shown FIG. 5, magnetic flux generated by the stator 15 of the motor passes through air gap 17, the coreless rotor 11, air gap 18 and the induction rod 13 in order and is returned to the stator 15, thus it completes a closed loop. In such a case, the induction rod 13 serves to prevent the magnetic flux lines generated by the stator 15 from being dissipated and to allow the generated magnetic flux to generate a sufficient torque to rotate the cup type coreless rotor 11.

Second Embodiment

Figure 6:
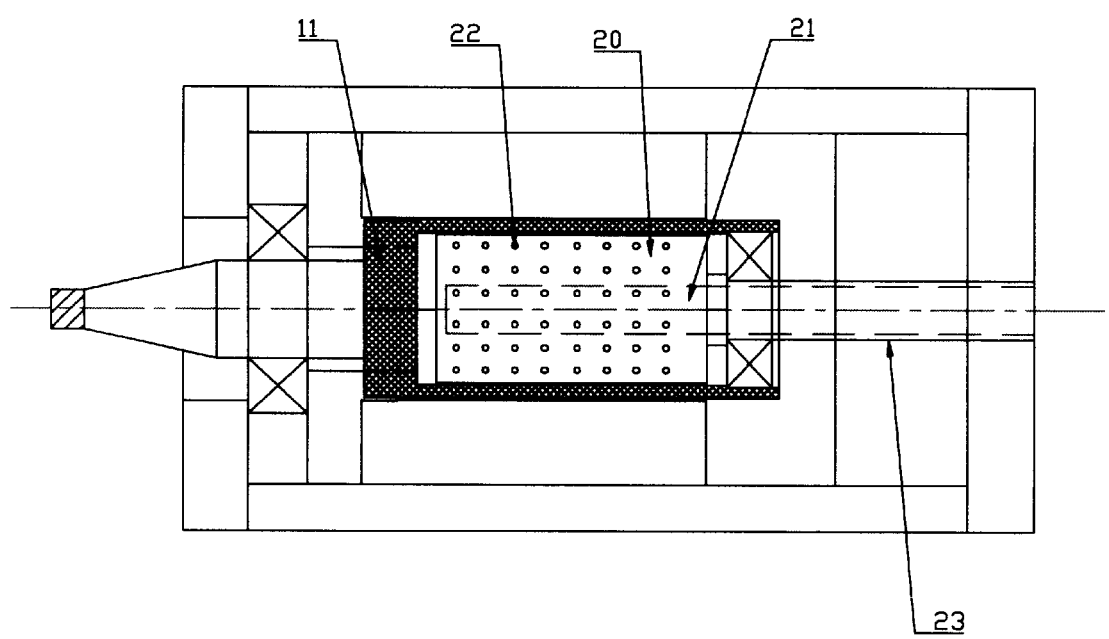
FIG. 6 is a schematic diagram of a coreless AC induction motor in accordance with a second embodiment of the present invention.
Figure 7:
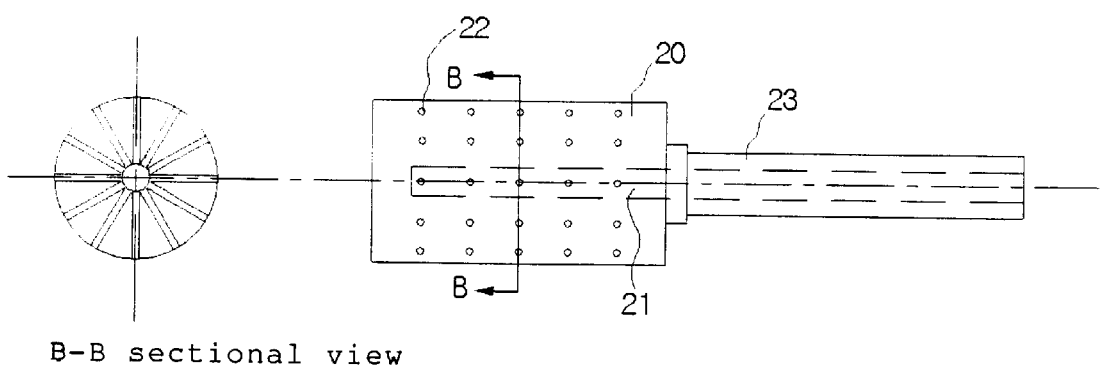
FIG. 7 is a detailed diagram showing the induction rod and the induction rod shaft of the coreless AC induction motor shown in FIG. 6.

In accompanying drawings, FIG. 6 is a schematic diagram of a coreless AC induction motor in accordance with a second embodiment of the present invention, and FIG. 7 is a detailed diagram showing the induction rod and the induction rod shaft of the coreless AC induction motor shown in FIG. 6.

As shown in FIGS. 6 and 7, the coreless AC induction motor of a second embodiment is the same as that of the first embodiment, except an air bearing system. Air is supplied to the induction rod through the air supply bore 21 and the supplied air functions as the bearing. Therefore, the same reference numerals are used to designate the same or similar components and the description of the same or similar components is omitted.

As the first embodiment of the present invention, since the coreless AC induction motor consists of a rotating parts and stationary parts that are separated from each other with small air gap, it is important that the two parts are aligned with each other during rotation. If the motor rotates while the rotating parts are not aligned with stationary parts due to deflection under their own weights, etc., the cup type coreless rotor 11 and the induction rod 13 may come into contact with each other, and the rotating parts may have serious problems including noise and vibration.

An air supply bore 21 is axially formed in the center portion of a induction rod 20 and a induction rod shaft 23, and plurality of air bearing holes 22 are radially and regularly formed in the induction rod 20 connected with the air supply bore 21.

Supplied air functions as a bearing between the cup type coreless rotor 11 and the induction rod 20 and is discharged through air supply bore 21 and the bearing holes 22.

As described above, since the supplied air functions as a bearing between the cup type coreless rotor 11 and the induction rod 20, a conventional contact bearing 16 is not necessary to maintain a regular air gap between the cup type coreless rotor 11 and the induction rod 20. Additionally, the supplied air efficiently dissipates the heat generated in the interior of the motor during the operation of the motor.

As described above, the present invention provides a coreless AC induction motor, in which its cup type coreless rotor is fabricated in such a way that a squirrel cage-shaped conduction cylinder with plurality of slots is made of aluminum or copper having high electric conductivity and the slots of the squirrel cage-shaped conduction cylinder are filled with composite material or polymer resin including powder having high magnetic permeability, such as iron or ferrite powder.

In addition, in the coreless AC induction motor of the present invention, the supplied air functions as a bearing, so that contact between rotating parts and stationary parts and heat generated during the operation of the motor can be efficiently prevented or eliminated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A coreless AC induction motor, comprising:
   a cup type coreless rotor;
   a rotating shaft;
   an induction rod inserted into the interior of said cup type coreless rotor to guide a magnetic flux;
   a stator positioned around said coreless rotor;
   wherein said cup type coreless rotor comprises a squirrel cage-shaped conduction cylinder and composite material or polymer resin, wherein said squirrel cage-shaped conduction cylinder is made of material having high electric conductivity, such as aluminum or copper, and has a plurality of slots regularly formed between the conduction rods along the length of the squirrel cage-shaped conduction cylinder, wherein said composite material or polymer resin fills the slots of said squirrel cage-shaped conduction cylinder to make up for the low stiffness of said squirrel caged-shaped conduction cylinder, said composite material or polymer resin includes powder having high magnetic permeability, such as iron or ferrite powder, to make up for the low magnetic permeability of said squirrel cage-shaped conduction cylinder, further comprising heat pipes, said heat pipes being inserted into the slots of said squirrel cage-shaped conduction cylinder in order to dissipate heat.

2. The motor according to claim 1, wherein said composite material or polymer resin includes powder having high magnetic permeability, such as iron or ferrite powder, to make up for the low magnetic permeability of said squirrel cage-shaped conduction cylinder.

3. The coreless AC conduction motor according to claim 1, wherein said heat pipe includes a fluid changeable between gas and liquid pleases according to the change of temperature within said heat pipe, which is capable of cooling heat generated in said coreless rotor by changing its phase.

4. A coreless AC induction motor, comprising:
   a cup type coreless rotor;
   a rotating shaft;
   an induction rod inserted into the interior of said cup type coreless rotor to guide a magnetic flux;
   a stator positioned around said cordless rotor;
   wherein said cup type coreless rotor comprises a squirrel cage-shaped conduction cylinder and composite material or polymer resin, wherein said squirrel cage-shaped conduction cylinder is made of material having high electric conductivity, such as aluminum or copper, and has a plurality of slots regularly formed between the conduction rods along the length of the squirrel cage-shaped conduction cylinder, wherein said composite material or polymer resin fills the slots of said squirrel cage-shaped conduction cylinder to make up for the low stiffness of said squirrel caged-shaped conduction cylinder, said composite material or polymer resin includes powder having high magnetic permeability, such as iron or ferrite powder, to make up for the low magnetic permeability of said squirrel cage-shaped conduction cylinder, further comprising a bearing, said bearing being positioned between said squirrel cage-shaped conduction cylinder and said induction rod to align said squirrel cage-shaped conduction cylinder with said induction rod.

5. A coreless AC induction motor, comprising:
   a cup type coreless rotor;
   a rotating shaft;
   an induction rod inserted into the interior of said cup type coreless rotor to guide a magnetic flux;
   a stator positioned around said coreless rotor;
   wherein said cup type coreless rotor comprises a squirrel cage-shaped conduction cylinder and composite material or polymer resin, wherein said squirrel cage-shaped conduction cylinder is made of material having high electric conductivity, such as aluminum or copper, and has a plurality of slots regularly formed between the conduction rods along the length of the squirrel cage-shaped conduction cylinder, wherein said composite material or polymer resin fills the slots of said squirrel cage-shaped conduction cylinder to make up for the low stiffness of said squirrel caged-shaped conduction cylinder, wherein said induction rod has an air supply bore in its central portion and also has a plurality of air bearing holes connected with the air supply bore, so that said supplied air functions as a bearing between said coreless rotor and said induction rod.

6. The motor according to claim 5, wherein said composite material or polymer resin includes powder having high magnetic permeability, such as iron or ferrite powder.

7. The motor according to claim 6, further comprising a bearing, said bearing being positioned between said squirrel cage-shaped conduction cylinder and said induction rod to align said squirrel cage-shaped conduction cylinder with said induction rod.

8. The motor according to claim 6, further comprising heat pipes, said heat pipes being inserted into the slots of said squirrel cage-shaped conduction cylinder in order to dissipate heat.

9. The motor according to claim 8, further comprising a bearing, said bearing positioned between said squirrel cage-shaped conduction cylinder and said induction rod to align said squirrel cage-shaped conduction cylinder with said induction rod.

10. The coreless AC induction motor according to claim 8, wherein said heat pipe includes a fluid changeable between gas and liquid phase according to the change of temperature within said heat pipe, which is capable of cooling heat generated in said coreless rotor by changing its phase.

* * * * *